(12) United States Patent
Lyndon et al.

(10) Patent No.: US 8,042,997 B2
(45) Date of Patent: Oct. 25, 2011

(54) RADIATION THERMOMETER

(75) Inventors: Adrian John Masefield Lyndon, Sheffield (GB); Ian Hamilton Ridley, Sheffield (GB); Stuart Francis Metcalfe, Sheffield (GB)

(73) Assignee: Land Instruments International Limited, Leicestershire (GB)

( * ) Notice: Subject to any disclaimer, the term of this patent is extended or adjusted under 35 U.S.C. 154(b) by 711 days.

(21) Appl. No.: 12/278,392

(22) PCT Filed: Feb. 6, 2007

(86) PCT No.: PCT/GB2007/000393
§ 371 (c)(1),
(2), (4) Date: Aug. 5, 2008

(87) PCT Pub. No.: WO2007/091036
PCT Pub. Date: Aug. 16, 2007

(65) Prior Publication Data
US 2009/0037135 A1    Feb. 5, 2009

(30) Foreign Application Priority Data
Feb. 6, 2006  (GB) .................................. 0602351.9

(51) Int. Cl.
*G01J 5/54* (2006.01)
*G01J 5/00* (2006.01)
(52) U.S. Cl. ...................... 374/131; 374/121; 250/338.1
(58) Field of Classification Search .................. 374/131, 374/121; 250/338.1
See application file for complete search history.

(56) References Cited

U.S. PATENT DOCUMENTS

| | | | | |
|---|---|---|---|---|
| 3,057,200 A | * | 10/1962 | Wood | 374/123 |
| 4,075,493 A | * | 2/1978 | Wickersheim | 374/159 |
| 4,257,106 A | * | 3/1981 | Auer | 250/338.1 |
| 4,459,044 A | * | 7/1984 | Alves | 374/131 |
| 4,765,752 A | * | 8/1988 | Beynon et al. | 374/153 |
| 5,024,533 A | * | 6/1991 | Egawa et al. | 374/126 |
| 5,265,036 A | | 11/1993 | Suarez-Gonzalez et al. | |
| 5,751,215 A | * | 5/1998 | Hall, Jr. | 340/584 |
| 5,833,367 A | * | 11/1998 | Cheslock et al. | 374/158 |
| 5,836,694 A | | 11/1998 | Nguyen | |
| 6,203,193 B1 | * | 3/2001 | Egawa | 374/126 |
| 6,647,350 B1 | | 11/2003 | Palfenier et al. | |
| 7,462,831 B2 | * | 12/2008 | Gooch et al. | 250/338.1 |
| 7,655,909 B2 | * | 2/2010 | Schimert et al. | 250/338.1 |
| 2004/0124377 A1 | | 7/2004 | Chiang | |
| 2005/0063453 A1 | | 3/2005 | Camm et al. | |
| 2006/0131500 A1 | * | 6/2006 | Dalakos et al. | 250/338.1 |

FOREIGN PATENT DOCUMENTS

DE    20 13 723 A1    10/1971

OTHER PUBLICATIONS

International Preliminary Report on Patentability for PCT Application No. PCT/GB2007/000393 of May 23, 2008.

(Continued)

*Primary Examiner* — Christopher Fulton
(74) *Attorney, Agent, or Firm* — Kilpatrick Townsend & Stockton LLP

(57) ABSTRACT

A radiation thermometer comprising a radiation detector and an optical input path arranged to direct radiation from an object of interest to the radiation detector is disclosed. The radiation detector is adapted to output a signal related to the radiation received from the object of interest, and a processor is adapted to generate temperature measurements from the signal. Filtering means are provided in the optical input path which are arranged to block radiation having a wavelength between approximately 0.92 and 0.98 microns.

20 Claims, 4 Drawing Sheets

OTHER PUBLICATIONS

International Search Report for PCT Application No. PCT/GB2007/000393 of Aug. 23, 2007.

Written Opinion for PCT Application No. PCT/GB2007/000393, Aug. 23, 2007.

* cited by examiner

RADIATION THERMOMETER

This invention relates to a radiation thermometer, preferably a portable radiation thermometer, for non-contact temperature measurement. Typically, radiation thermometers are used to take "spot" measurements of a body's temperature.

Radiation thermometers generate temperature measurements by observing and measuring radiation, typically in the form of infrared energy, emitted by a target body. Infrared radiation (IR) is emitted by all materials at temperatures above absolute zero. This energy travels in the form of electromagnetic waves with wavelengths typically in the range 0.7 to 20 microns. When an infrared ray is intercepted by a body which is not transparent to the infrared spectrum, electronic transitions are induced, or the IR energy is converted into heat, and the infrared rays may be observed. The wavelength and intensity characteristics of the emitted radiation depend on the temperature and emissivity of the target body. Therefore by detecting and measuring the amount of radiation emitted within a particular wavelength range, and having knowledge of the body's emissivity, its temperature can be determined.

Radiation thermometers use a radiation detector, which responds to infrared radiation (IR). The detector can work on thermal or photonic principals, but generally photonic detectors are preferred since they offer improved response times and sensitivity. IR incident on a photonic detector causes electrons to be excited into higher energy states. This manifests itself typically as either a change in resistivity of the detector element or, if the detector contains a pn junction, as a photoelectric current.

Typical radiation detectors are based on silicon or other semiconductor materials. Silicon detectors are sensitive to radiation having wavelengths from about 0.4 microns up to approximately 1.1 microns. FIG. 1 is a graph showing the variation of sensitivity of a silicon based detector with wavelength (solid line I), and it will be seen that there is a sharp cut-off at approximately 1.1 microns. In order to remove interference from other radiation sources in the vicinity, typically the detector is provided with a daylight blocking filter which removes radiation having wavelengths up to approximately 0.85 microns from that incident on the detector (represented on FIG. 1 by dashed line ii). The blocked range includes radiation emitted by the Sun and by visible lamps, thereby insuring that the radiation received by the detector is, in the majority, emitted by the target body itself. With the daylight filter fitted, the working waveband becomes approximately 0.85 to 1.1 microns.

Silicon detectors are stable, low-cost devices. Moreover the silicon detector waveband is very well suited to measuring temperatures of relatively high temperature industrial targets—ie roughly 550 C. to 2000 C. In this waveband the radiation emission increases very rapidly with temperature making the thermometer very sensitive to temperature and, by comparison, insensitive to emissivity. Moreover the waveband falls in a good atmospheric 'window', so air in the sight path from the thermometer to the target is close to transparent and does not greatly affect the measurement.

However, there do exist some water vapour absorption bands in the silicon detector waveband. These are comparatively weak but, if the sight path is long enough and the air holds enough water, then these bands can affect the transparency of the sight path sufficiently to compromise the measurement. The effect becomes most noticeable at very high air temperatures, for example in furnaces. The capacity of air to hold water vapour increases rapidly with temperature and high temperature absorption bands appear corresponding to upward transitions from already-excited states of the water molecule. There is a lack of reliable data on these high temperature absorption bands.

What is needed is a radiation thermometer which is less affected by water vapour in the atmosphere, yet otherwise has the same or improved measurement capability as conventional devices.

In accordance with a first aspect of the present invention, a radiation thermometer comprises a radiation detector and an optical input path arranged to direct radiation from an object of interest to the radiation detector, the radiation detector adapted to output a signal related to the radiation received from the object of interest, and a processor adapted to generate temperature measurements from the signal, wherein filtering means are provided in the optical input path and which are arranged to block radiation having a wavelength between approximately 0.92 and 0.98 microns.

The present inventors have found that by incorporating radiation filtering means which remove wavelengths between approximately 0.92 and 0.98 microns, the effect of any water vapour absorption which occurs is largely eliminated in the radiation thermometer. Nonetheless, the detector still receives radiation having wavelengths greater than and less than the narrow blocked wavelength band and so maintains a broad temperature range capability. In particular, in the example of a silicon detector, the temperature measurement capability and performance of the instrument is substantially the same as for the conventional instrument.

Preferably, the filtering means are arranged to additionally block radiation having a wavelength less than approximately 0.85 microns. As described above, this acts as a daylight blocking filter and reduces interference from other radiation sources.

In some embodiments, the filtering means can conveniently be arranged to additionally block radiation having a wavelength of more than approximately 1.1 microns. This may be of use where a detector based on a material other than silicon is used and it is wished to maintain a 0.85 to 1.1 microns detected wavelength range. However, in the preferred example, the radiation detector is not sensitive to radiation having a wavelength of more than approximately 1.1 microns.

Preferably, the filtering means comprise one or more spectral filters. That is, in some embodiments it is of use to provide the 0.92 to 0.98 microns filter separately from any other filtering means provided, so that it, or any of the other filtering means, can be selectively employed.

Conveniently, the radiation thermometer further comprises an objective lens assembly having an adjustable separation from a field stop mounted close to the detector, the objective lens assembly being disposed in the optical input path between the object of interest and the filtering means. This enables the radiation thermometer to be focussed onto a target body at a range of distances.

Preferably, the radiation thermometer further comprises a splitter assembly disposed in the optical input path between the object of interest and the filtering means, the splitter assembly adapted to direct a portion of the radiation from the object of interest along an optical viewing path. This can be used to observe the scene visible to the radiation thermometer and accurately identify the point on the target body at which the temperature measurement is to be taken. The scene observed could be output to display on a separate monitor, but preferably, the radiation thermometer further comprises a visible light viewing assembly ('eyepiece') disposed in the optical viewing path and arranged to view a visible light image of the object of interest. This provides a convenient and user-friendly way of aiming the radiation thermometer accurately on the target body.

Advantageously, the visible light viewing assembly comprises means for viewing the visible light image of the object of interest, together with a graticule for defining a target area on the visible light image. The graticule aids the user in pinpointing the position on the target body at which the temperature measurement is to be taken.

Preferably, the radiation thermometer further comprises a field stop aperture disposed in the optical input path. This can be used to limit the field from which radiation is visible to the detector. Advantageously, the field stop aperture is adapted to pass only radiation emanating from the target area of the object of interest corresponding to the target area on the visible light image defined by the graticule. Accurate correspondence between the graticule and the radiation received by the detector ensures that the reading corresponds to the selected area on the target body. Advantageously, the radiation thermometer further comprises an internal display, viewable by the visible light viewing assembly, for displaying the temperature measurements generated by the processor. This allows the user to observe the scene visible to the thermometer, in particular the target area, simultaneously with a reading of the temperature measurement. Preferably, the internal display is adjacent to the graticule.

Advantageously, the radiation detector is a semiconductor detector, and the semiconductor preferably comprises silicon or InGaAs.

Preferably, the processor is adapted to generate temperature measurements in one or more of an instantaneous temperature mode, an average temperature mode, a peak-picking temperature mode and a valley-picking temperature mode. The user can select the most appropriate mode for each application.

Advantageously, the radiation thermometer further comprises a switch for controlling the operation of the processor. In other examples, the processor could be controlled by downloading information from a remote computer.

Advantageously, the switch is operable between three positions, each position corresponding to a different command for operation of the processor. This provides a particularly convenient way for the user to control the operation of the thermometer. For example, in one embodiment, position 1 may be 'idle' with the instrument consuming little power, position 2 may result in a temperature being read and displayed, position 3 may result in that temperature being transmitted to remote data logging equipment.

Preferably, the radiation thermometer further comprises a memory for storing the signal output by the detector or the temperature measurements generated by the processor.

In a particularly preferred example, the radiation thermometer further comprises an external display, viewable by a user, for displaying data including the temperature measurements generated by the processor. This provides an convenient and versatile user interface. Preferably the data displayed by the external display further includes one or more of a user set parameter and control settings relating to the operation of the radiation thermometer.

Preferably, the radiation thermometer further comprises a connector for a serial data connection, for communication with an external device. However, in particularly preferred examples, the radiation thermometer further comprises a wireless data connection module for wireless communication with an external device. Advantageously, the wireless data connection module supports the Bluetooth protocol. Preferably, the wireless data connection is adapted to transmit the temperature measurements generated by the processor to the external device. In certain examples, it is advantageous if the wireless data connection is further adapted to transmit at least one parameter used by the processor to generate the temperature measurements from the signal. Preferably, the at least one parameter includes one or more of emissivity data, calibration settings and time constants.

Advantageously, the radiation thermometer is portable. In this context, "portable" means that the device is adapted to be held by a human operator during use. This should be contrasted with static devices which are typically mounted to a wall or other object.

The invention further provides a system for monitoring temperature comprising a central processing unit having a wireless data connection module and one or more radiation thermometers as described above, adapted to communicate with the central processing unit. Preferably, the central processing unit is adapted to perform data logging.

A simple embodiment of this system may be a hand-held thermometer communicating wirelessly via Bluetooth with an IPAQ (PDA) data-logger in the shirt pocket of the operator.

A further difficultly often encountered using conventional radiation thermometers is that they are not well adapted for taking measurements of rapidly changing temperature. For example, using a conventional portable IR thermometer, if it is desired to measure the temperature profile of a hot object (e.g. as it exits a furnace), then the user must attempt to aim the instrument consistently for the whole period of time, take a series of individual measurements, and record the data points. This is clearly prone to significant user error and is limited by the speed at which a human operator can take measurements (i.e. by the time it takes to press and release a switch). Further, in portable instruments it is extremely difficult to maintain the aim of the thermometer at the same time as taking the measurements.

What is needed is a technique which supports these conventional modes of operation yet overcomes the aforementioned drawbacks.

In accordance with a second aspect of the present invention, a method of monitoring temperature of a target using a radiation thermometer having a memory for storing data, comprises:

receiving radiation emitted by the target at the radiation thermometer;

generating a temperature signal derived from the received radiation;

sampling the temperature signal at predetermined intervals to produce a plurality of sample values;

recording each of the plurality of sample values in the memory; and transmitting the stored plurality of sample values to an external device.

This 'burst' mode of operating greatly enhances the utility of a hand-held radiation thermometer considerably. In particular, it becomes possible to capture data at great speed and record the full series of data points in an external device for later analysis. For example, where sudden changes in the temperature of a body take place, the thermometer can be aimed to observe a particular point on the body, the switch pressed for a predetermined period of time, and the sampled data can be used to monitor the change in its temperature. Alternatively, the switch can be pressed while a hot target moves across the line of sight of the thermometer and the sampled data gives a temperature profile of the body. The user no longer has to control the taking and logging of each data point themselves.

Preferably, each of the plurality of sampled values is recorded in the memory before transmission to the external device. This allows each sample to be transmitted individually immediately after it is sampled or a whole set (e.g. the whole of the plurality) of sampled values to be transmitted as a continuous data stream.

Advantageously, once the plurality of sample values has been transmitted to the external device, they are deleted from the memory in the radiation thermometer. However, it certain cases it may be preferred to maintain the local record as a "back-up" copy.

Preferably, the method further comprises transmitting at least one parameter comprising associated data relating to settings in the thermometer. Advantageously this is a parameter used by the processor to generate the sample values from the signal—eg the set emissivity value.

The particular manner in which the data is transmitted can be selected according to the task in hand. In a particularly preferred embodiment, the step of transmitting occurs after each of the plurality of sample values is produced. In other words, the data is output at substantially real time. In other examples, the step of transmitting may occur after all of the plurality of sample values have been produced. This may be of benefit if the radiation thermometer and external device are not local to one another and no wireless communication means are available. The transmitting could alternatively occur after a subset of the plurality of sample values has been produced.

Preferably, the method further comprises recording at least some of the plurality of sample values in the external device. The data can then be manipulated and processed as desired.

Advantageously, sample values transmitted during the determined period are recorded by the external device. Conveniently, the predetermined period is between 1 and 60 seconds, preferably about 30 seconds, although this can be varied according to the application. In a particularly preferred example, the duration of the predetermined intervals is 250 milliseconds or less, preferably approximately 30 milliseconds. Again, the predetermined intervals can be selected according to the measurements being undertaken.

In some examples, the transmitting is performed via a serial port connection between the radiation thermometer and the external device.

However, it is preferred that the transmitting is performed via a wireless connection between the radiation thermometer and the external device so that no physical limitations are imposed on the relative locations of the thermometer and the device. It is particularly preferred that the wireless connection should utilise the Bluetooth protocol.

Where the radiation thermometer further comprises a switch for controlling the operation of the processor, the switch being operable between three positions and each position corresponding to a different command for operation of the processor, it is preferred that the method further comprises:

initiating generation and sampling of the temperature signal by moving the switch from a first position to a second position;

when the switch is at the second position, generating and sampling the temperature signal according to one or more of an instantaneous temperature mode, an average temperature mode, a peak-picking temperature mode and a valley-picking temperature mode;

moving the switch from the second position to a third position; and when the switch is at the third position, continuously transmitting temperature measurements generated according to the instantaneous temperature mode during at least a portion of the period for which the switch is at the third position, to an external device.

This technique has been found to be a convenient and user-friendly method for operating the thermometer. Preferably, the temperature measurements are continuously transmitted for the whole duration of the period for which the switch is in the third position. However, in some examples, the temperature measurements are continuously transmitted for a predetermined duration, which may or may not exceed the period for which the switch is at the third position.

An example of a radiation thermometer and method of measuring temperature using a radiation thermometer in accordance with the present invention will now be described with reference to the accompanying drawings in which.

Figure 2:
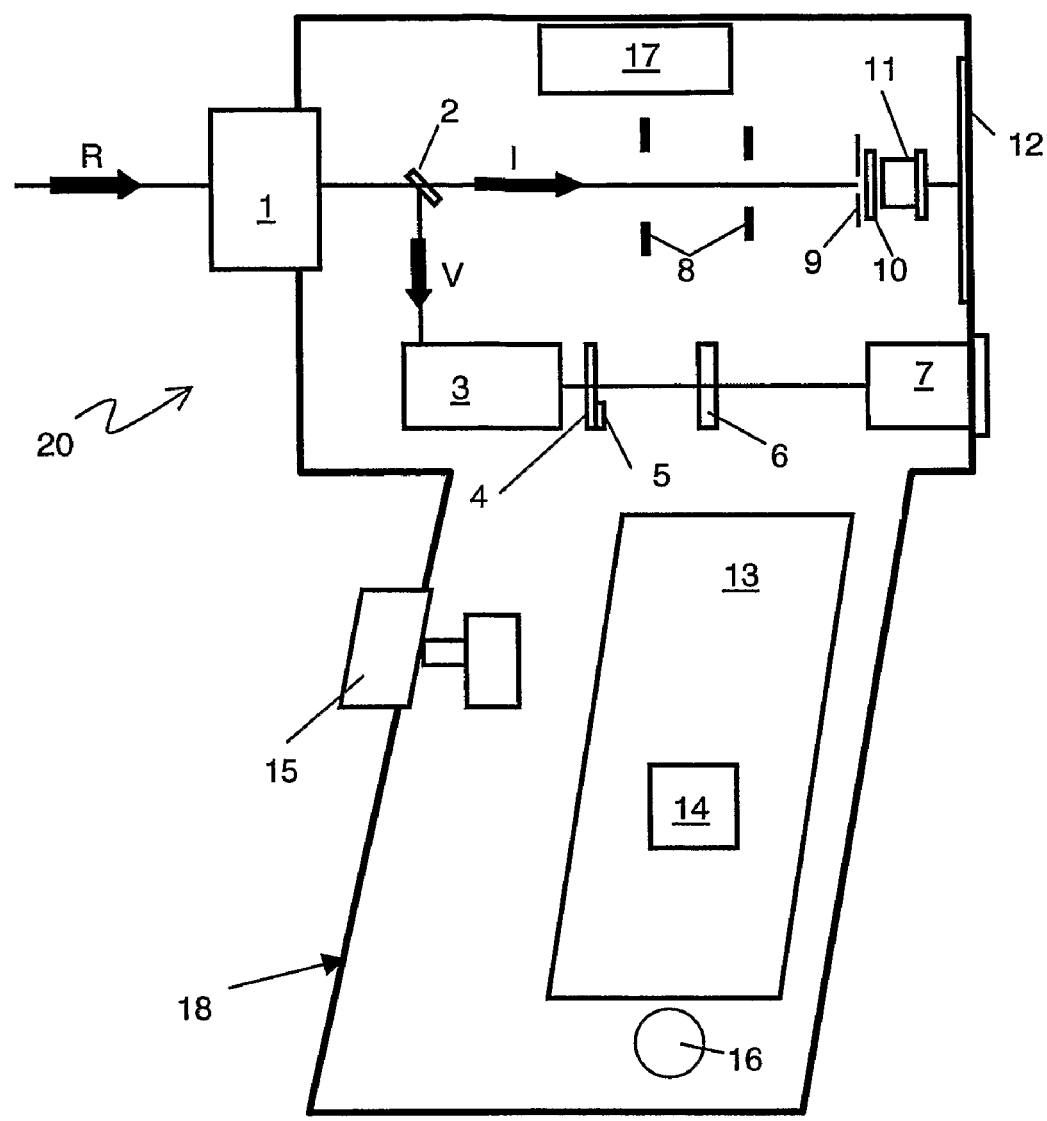
FIG. 2 is a schematic diagram showing the components of a first embodiment of a radiation thermometer in accordance with the present invention.

A first embodiment of a radiation thermometer 20 is shown schematically in FIG. 2. As detailed below, it will be appreciated that many of the components described are optional and could be omitted or replaced with alternative means. The thermometer is preferably portable—that is, it is adapted to be held by a user during operation.

The radiation thermometer 20 receives radiation R from a target body (not shown) through an aperture in the housing 18 which, in this example, is provided in the form of an objective lens assembly 1. Here, the objective lens assembly 1 is focusable such that target bodies at different distances from the thermometer 20 can be selected. The objective lens assembly 1 is not wavelength-selective and, as such, the thermometer receives both infrared radiation (IR) and visible light from the scene viewed by the instrument.

Figure 1:
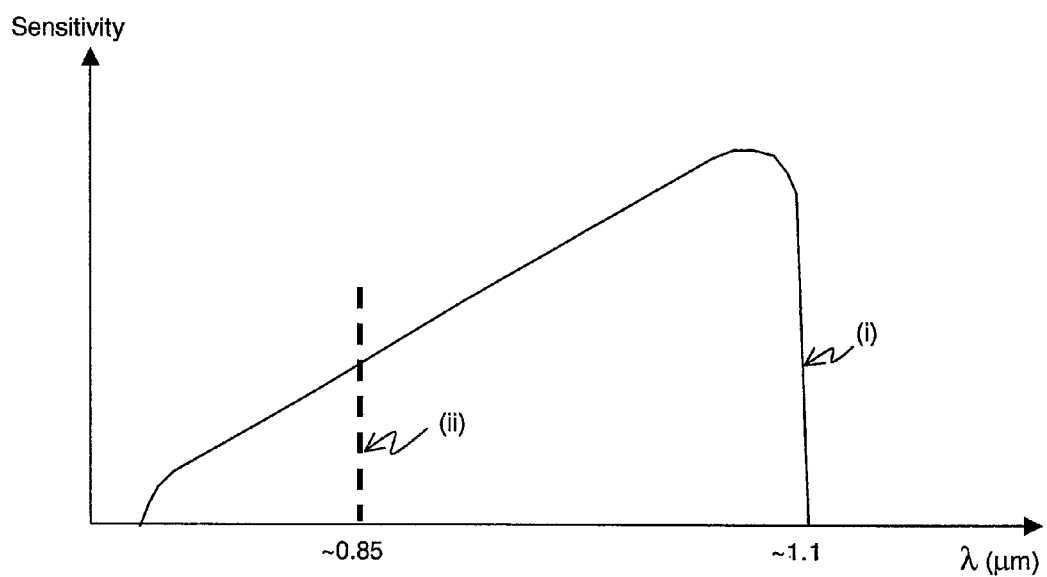
FIG. 1 is a graph showing the variation of sensitivity of a typical silicon based radiation detector with wavelength of incident radiation.

At least part of the received radiation passes along an optical input path I to radiation detector 11 which produces a signal corresponding to the amount of incident radiation to which the detector 11 is sensitive. As described above with respect to FIG. 1, the radiation detector 11 is typically silicon although it could be made from other semiconductor materials such as InGaAs (possibly in conjunction with a short-pass filter), and is typically sensitive to radiation having wavelengths of up to approximately 1.1 microns. The signal generated by the radiation detector 11 is output to a processor 13 via a first circuit board 12 for initial processing. The processor 13 (described in more detail below) converts the detector signal into a temperature measurement indicative of the temperature of the target body. This conversion step requires knowledge of the target body's emissivity and this is provided by the user entering an emissivity set point (i.e. estimate of the body's emissivity).

In order to prevent any occurring water vapour absorption from distorting the temperature measurements, filtering means 10 are included in the optical input path I. The filtering means 10 block radiation having wavelengths in the approximate range 0.92 to 0.98 microns (to about plus/minus 0.01 microns or so on each edge) from reaching the detector 11.

The detector 11 receives and responds to radiation having wavelengths greater than and less than the excluded range, within the bounds of the detector's sensitivity.

Figure 3:
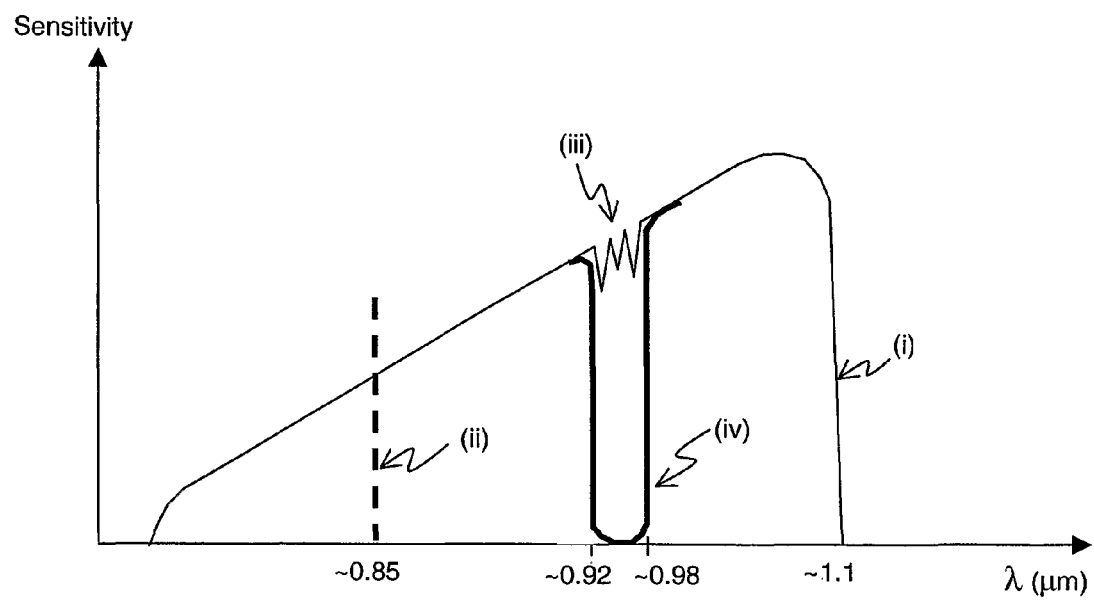
FIG. 3 is a graph showing the sensitivity of the radiation thermometer shown in FIG. 2.

FIG. 3 shows the sensitivity of the detector arrangement in the case of a silicon detector, taking into account the effect of filtering means 10. As in FIG. 1, the inherent sensitivity of the detector 11 is indicated by line I. The absorption caused by water vapour existing in the atmosphere between the target body and the thermometer is indicated by troughs iii which have been found to occur in the wavelength range 0.92 to 0.98 microns. The solid line iv represents the effect of the filtering means 10, which in this case is provided in the form of a notch filter blocking radiation having a wavelength in the aforementioned range.

The resulting detector assembly is substantially unaffected by water vapour in the atmosphere yet remains sensitive to a broad range of wavelengths, enabling it to be used for the measurement of targets with temperatures similar to those accessible with a conventional silicon cell thermometer.

In this embodiment, the filtering means 10 further comprises a daylight blocking filter which prevents radiation having a wavelength less than approximately 0.85 microns from reaching the detector 11. As in FIG. 1, this is indicated in FIG. 3 by dashed line ii. In this example, a single filtering means 10 provides both the daylight blocking filter ii and the notch filter iv, but in other examples these functions could be carried out by separate spectral filters.

In this embodiment, radiation R entering the thermometer 20 through objective lens assembly 1 is split along two paths by splitter 2, which could be provided in the form of a "pick off" mirror. A first portion of the radiation continues along optical input path I as previously described, whereas a second portion of the radiation is directed along an optical viewing path V. In this example, the splitter 2 is not wavelength dependent and therefore both infrared and visible light travel along each of the optical paths I and V.

Radiation on the optical viewing path V is passed to a visible light viewing assembly 7, here in the form of an eyepiece. In order that the image appears correctly orientated, the optical viewing path V includes in this case a prism assembly 3 which manipulates the radiation from the splitter 2 towards the eyepiece 7. Also provided in the optical viewing path V are a graticule 4 and internal display 5, both of which are visible through the eyepiece 7 along with the image of the scene formed from the visible radiation diverted at splitter 2. In order that the graticule 4 and display 5 are focussed, an intermediate lens 6 may be provided to act as the field lens for the eyepiece 7, and the eyepiece 7 itself may be in the form of two elements which can be adjusted by the user to suit their eyesight, as in conventional microscopes.

Figure 4:
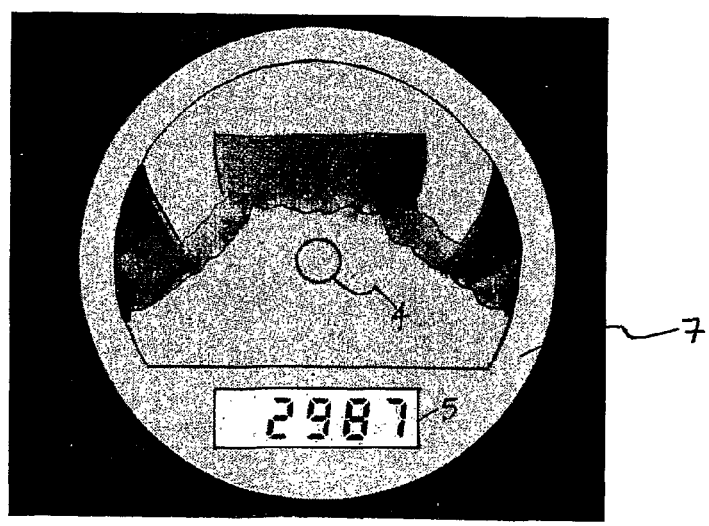
FIG. 4 is an exemplary illustration of a scene viewed by a user through the radiation thermometer of FIG. 2.

FIG. 4 shows a typical view through eyepiece 7. In the main part of the viewfinder, the user can observe the scene as viewed by the thermometer 20 through objective lens 1. In this example, the scene observed is a flow of molten metal exiting a furnace. In the centre of the view, the graticule 4 is visible. In this example, the graticule 4 takes the form of a circle centred on the middle of the visible display. However, in other examples, any shape of graticule could be used which defines a point or area of the visible display. It need not be in the centre of the display, although this is convenient as will be discussed below.

Alongside the view of the visible scene, the internal display 5 is presented. Here, the internal display 5 is provided in the form of a liquid crystal display. The display 5 is controlled to display a temperature measurement output by the processor 13. Depending on the mode of operation, the temperature reading may be an instantaneous measurement corresponding to the temperature of the target body in real time, or a peak-picked, valley-picked or averaged value. The various modes of operation will be discussed in more detail below.

In order that the generated temperature corresponds accurately to the target body identified by the graticule 4 in the visible display, a field stop 9 is preferably included in the optical input path I. The field stop 9 passes radiation to the detector 11, through filtering means 10, but is sized and positioned such that only radiation emanating from the target area as visibly defined by the graticule 4 on the target body is passed.

Additional stops 8 to reduce unwanted internal reflections may optionally be included on the optical input path I.

As described above, initial processing is carried out on circuit board 12 which typically includes, amongst other components, a switched logarithmic amplifier, the input of the amplifier being switched sequentially between the radiation detector 11, a first current reference source (not shown) and a second reference current source (not shown). The board further includes an analogue-to-digital converter for outputting the signal to processor 13 where the main data manipulation is carried out. Processor 13 is provided in the form of a circuit board and comprises a microprocessor based electronic circuit with embedded software for deriving a temperature measurement from the detected radiation power, as well as a memory for local storage of parameters and measurement data, and a communications module. Typically, the communications module comprises a serial port which can be accessed via connector 16. However in more advanced embodiments, a wireless communication module 14 may be included.

Figure 5:
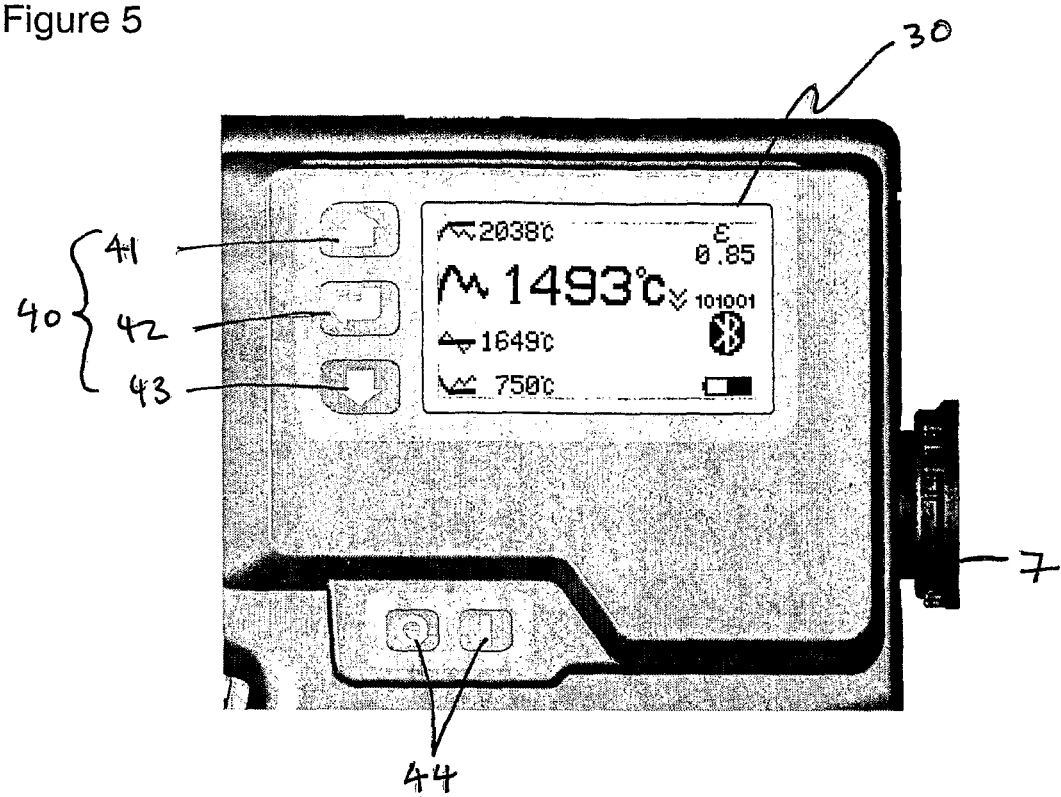
FIG. 5 is a partial view of the exterior of the radiation thermometer shown in FIG. 2; and, FIG. 6 illustrates the external display shown in FIG. 5 and the icons thereon.

The processor 13 outputs data to the internal display 5 and, if so desired, through one or other of the communications modules to an external device such as a computer, PDA or other remote data storage device. The processing board 13 also controls an external display 30 disposed on the exterior of the housing 18 as shown in FIG. 5. In this example, the external display 30 is a liquid crystal display and is used to present the generated temperature measurements as well as user-set parameters such as the emissivity of the target body, a window attenuation factor (an allowance for radiation losses in a window between the thermometer and the target object) and time constants. The display 30 uses an icon-based menu system to assist user adjustment of such parameters. Keypad controls 40 disposed on the exterior of the housing 18 adjacent the display 30 are used to access the menu system and adjust the user set parameters. An on/off switch 44 is also provided.

Figure 6:
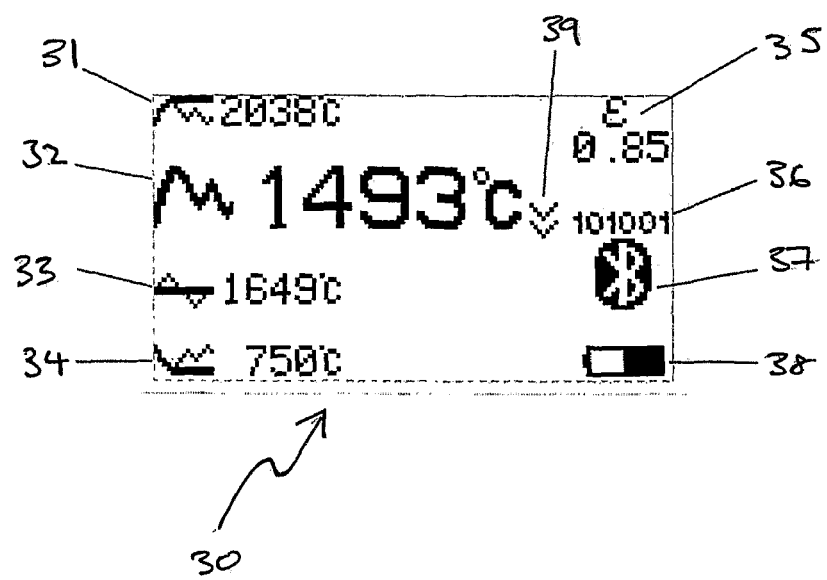

Examples of the icons presented on the sound display 30 are shown in FIG. 6. Icon 31 represents the peak temperature measurement. Icon 32 represents continuous temperature measurement. Icon 33 represents average temperature measurement. Icon 34 represents the valley (lowest) temperature measurement. Icon 35 indicates the emissivity set point. Icon 36 indicates that communications are active. Icon 37 indicates that Bluetooth is active, and icon 38 gives an indication of the battery condition. Icon 39 is a low alarm symbol which lights should the measured temperature fall below a pre-set alarm threshold—ie target is 'too cold' for an accurate temperature measurement to be taken.

The four temperature measurements indicated on the display 30 correspond to four temperature measurement modes in which the thermometer can operate. In the instantaneous or "continuous" measurement mode, the processor 13 updates the temperature measurement every half second. The display accompanying icon 32 is updated at the same frequency and, if this temperature measurement mode is selected to be displayed on the internal display 5, this display is also regularly updated.

In average temperature mode, the processor calculates the average temperature using a predetermined time constant. In a preferred example, the average is calculated from the instant at which the measurement is initiated by the user. The time constant for calculating the average can be adjusted using the display 30 and input keys 40.

In peak temperature mode, the temperature displayed is the maximum recorded from the instant at which the user initiates measurement. The analogue detector signal is sampled at intervals (e.g. 30 milliseconds) to identify the peaks.

Finally, in valley temperature measurement mode, the minimum temperature measurement from initiation of the process is displayed and, again, the analogue stream is sampled at regular intervals.

Measurements using the thermometer are initiated using switch 15 shown in FIG. 2. In this example, the switch 15 is a trigger switch movable between three positions, each of which conveys a different command to the processor 13. The commands differ according to how the thermometer is set up.

There are three main manners in which the instrument can be operated. In "Classic" mode, all four of the above described temperature measurements are generated by the processor 13 and are displayed continuously on the external display 30 when the trigger switch 15 is pressed. The user can select one of the four modes, for display in the internal display 5. When the trigger switch 15 is released, the most recent value for the selected temperature measurement (only) is output to an external device via the communications module (either serially via a cable connection and/or by wireless means if available). For example, if the selected temperature measurement is the "continuous" value, then when the device is aimed at an object, the processor will sample the temperature signal (without retaining a log) and update the internal display at approximately half-second intervals. When the user releases the switch, the most recently updated "continuous" temperature value displayed on the internal screen (which is only temporarily stored in the thermometer's local memory) is transmitted to the external device and logged.

It will be noted that only two of the three positions of the trigger switch 15 are used in this mode: data measurements start when the trigger switch 15 is moved from position 1 to position 2 (or from position 1 through position 2 to position 3) and end when the trigger is released, with the final measurement being stored.

In "Advanced Logging" mode, the multiple position capability of the trigger switch 15 is utilized. Operation of the thermometer is as per the Classic mode described above when the trigger is pressed from its first (rest) position into a second position. When the trigger switch 15 is moved to a third position, the internal and external displays hold the last temperature and a full data packet comprising the four most recent calculated temperatures in each of the measurement modes as well as the emissivity set-point and the window attenuation factor is output via the communications module to an external device.

Also provided is an offline display via the external display 30 and menu system. This provides the user with an average of the average measurements, the peak of the peak measurements, the valley of the valley measurements and the average of the instantaneous measurements calculated since the last switch-on. The user has the option whether to continue accumulating data or to clear the memory.

In "Advanced Burst" mode, operation of the thermometer is as per classic mode when the trigger is in its first and second positions. When the trigger is moved to position three, the instantaneous (continuous) temperature data is taken and output at high speed to the communications module. In this mode, the signal generated by the detector 11 is sampled at a high rate, using for example an approximately 30 millisecond sample interval, and is transmitted to the external device so as to provide a batch of data across a predetermined duration. In this mode, each data point may be recorded by the local memory in the thermometer, prior to transmission to the external device.

Depending on the communications means available, the sample interval and the predetermined duration, it is preferred to transmit each data sample as it is generated. In this way, the data set can be built up in approximately real time. In other cases, the transmission may take place after all of the sample values have been generated, or in stages after subsets of values have been generated. Each data point can be deleted from the thermometer's local memory as soon as it has been transmitted (or at a later time if desired).

In this mode, it is possible to generate a series of data which is particularly well adapted for monitoring fast changes in temperature of a target over a short period of time, or taking a temperature profile of an object moving relative to the thermometer. In a particularly preferred embodiment, a handheld computer or laptop PC is provided as the external device and can be used for data logging. The computer may simultaneously be used to log data from more than one radiation thermometer as described above.

In Classic mode, the selected (instantaneous, average, peak or valley) temperature is displayed in the eyepiece when the trigger is pressed and logged at release of the trigger switch.

In Advanced Logging mode, the selected (instantaneous, average, peak or valley) temperature is displayed in the eyepiece when the trigger is pressed to its second position and a full data packet comprising all four values together with emissivity and other data is sent when the trigger is moved to position three, logged and time stamped.

In Advanced Burst mode, when the trigger is pulled to position three, repeated temperature readings are taken at a fast rate and the data streamed down the serial connection to a to a file in the external device. In a preferred example, up to 30 seconds of data can be recorded in one file but this depends on the memory available.

In all modes the computer responds to the thermometer to confirm that a reading has been successfully received and the thermometer can give an indication of this by adjusting the brightness of its LCD display backlight and or emitting an audible alarm sound (using the audible alarm provided on processor board 13).

The invention claimed is:

1. A radiation thermometer comprising a radiation detector and an optical input path arranged to direct radiation from an object of interest to the radiation detector, the radiation detector adapted to output a signal related to the radiation received from the object of interest, and a processor adapted to generate temperature measurements from the signal, wherein the radiation thermometer is adapted to detect radiation having wavelengths between approximately 0.85 and 1.10 microns and filtering means are provided in the optical input path and which are arranged to block radiation having a wavelength between approximately 0.92 and 0.98 microns whilst passing radiation having wavelengths less than 0.92 microns and greater than 0.98 microns.

2. A radiation thermometer according to claim 1 wherein, in order for the radiation thermometer to be adapted to detect radiation having wavelengths between approximately 0.85 and 1.10 microns, the filtering means are arranged to additionally block radiation having a wavelength less than approximately 0.85 microns.

3. A radiation thermometer according to claim 1 wherein, in order for the radiation thermometer to be adapted to detect radiation having wavelengths between approximately 0.85 and 1.10 microns, the filtering means are arranged to additionally block radiation having a wavelength more than approximately 1.10 microns.

4. A radiation thermometer according to claim 1 wherein, in order for the radiation thermometer to be adapted to detect radiation having wavelengths between approximately 0.85 and 1.10 microns, the radiation detector is not sensitive to radiation having a wavelength more than approximately 1.10 microns.

5. A radiation thermometer according to claim 1 wherein the filtering means comprise one or more spectral filters.

6. A radiation thermometer according to claim 1 further comprising an objective lens assembly having adjustable separation from a field stop fixed close to the detector, the objective lens assembly being disposed in the optical input path between the object of interest and the filtering means.

7. A radiation thermometer according to claim 1 further comprising a splitter assembly disposed in the optical input path between the object of interest and the filtering means, the splitter assembly adapted to direct a portion of the radiation from the object of interest along an optical viewing path.

8. A radiation thermometer according to claim 7 further comprising a visible-light viewing assembly disposed in the optical viewing path and arranged to generate a visible-light image of the object of interest.

9. A radiation thermometer according to claim 8 wherein the visible-light viewing assembly comprises means for viewing the visible-light image of the object of interest together with a graticule for defining a target area on the visible-light image.

10. A radiation thermometer according to claim 9 further comprising a field-stop aperture disposed in the optical input path.

11. A radiation thermometer according to claim 10 wherein the field stop is adapted to pass only radiation emanating from the target area of the object of interest corresponding to the target area on the visible-light image defined by the graticule.

12. A radiation thermometer according to claim 1 wherein the radiation detector is a semiconductor detector, the semiconductor preferably comprising silicon or InGaAs.

13. A radiation thermometer according to claim 1 wherein the radiation thermometer is portable.

14. A radiation thermometer according to claim 1 further comprising a wireless data connection module for wireless communication with an external device.

15. A radiation thermometer according to claim 14 wherein the wireless data connection module supports the Bluetooth protocol.

16. A radiation thermometer according to claim 15 wherein the wireless data connection is adapted to transmit the temperature measurements generated by the processor to the external device.

17. A radiation thermometer according to claim 16 wherein the wireless data connection is further adapted to transmit at least one parameter used by the processor to generate the temperature measurements from the signal.

18. A radiation thermometer according to claim 17 where in the at least one parameter includes one or more of emissivity data, calibration settings and time constants.

19. A system for monitoring temperature comprising a central processing unit having a wireless data connection module and one or more radiation thermometers according to claim 14 adapted to communicate with the central processing unit.

20. A system for monitoring temperature according to claim 19 wherein the central processing unit is adapted to perform data logging.

* * * * *